Figure 1:
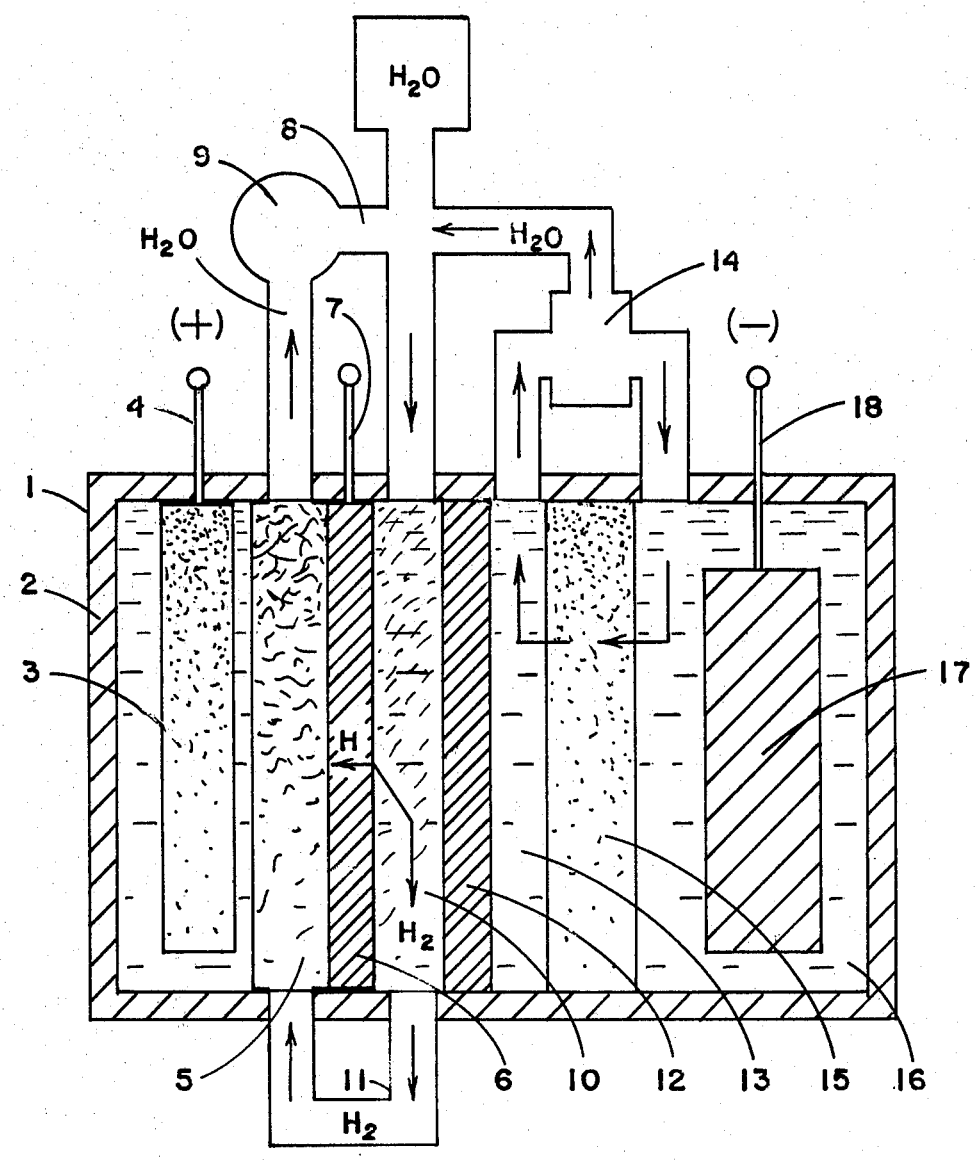

United States Patent [19]

Stachurski

[11] 4,296,184
[45] Oct. 20, 1981

[54] ELECTROCHEMICAL CELL

[76] Inventor: John Z. O. Stachurski, 220 Kaymar Dr., Amherst, N.Y. 14150

[21] Appl. No.: 109,241

[22] Filed: Jan. 3, 1980

[51] Int. Cl.³ .......................................... H01M 12/04
[52] U.S. Cl. ...................................... 429/14; 429/34; 429/27; 429/101
[58] Field of Search ................. 429/12, 13, 27, 28, 429/29, 101, 105, 14, 34

[56] References Cited

U.S. PATENT DOCUMENTS

| | | | |
|---|---|---|---|
| 3,092,516 | 6/1963 | Rightmire | 429/13 |
| 3,201,283 | 8/1965 | Dengler | 429/14 |
| 3,470,026 | 9/1969 | Juda et al. | 429/13 |
| 3,607,417 | 9/1971 | McRae et al. | 429/29 |
| 3,703,416 | 11/1972 | Jocquelin | 429/34 |
| 4,004,946 | 1/1977 | Farrington et al. | 429/27 |

Primary Examiner—Donald L. Walton

[57] ABSTRACT

An electrochemical cell and the method to operate same are described. The cell comprises at least two compartments, first and second, separated by a semipermeable membrane, said compartments containing first and second solvent, electrolyte and electrode.

The first compartment is subdivided by a membrane which behaves as a bipolar electrode during the passage of electric current. The bipolar character of the membrane arises due to the evolution of certain atomic or molecular species on one side of the membrane and the ionization of said atomic or molecular species on the opposite side of the membrane. Said electrode also allows recharging of the second electrode. Means of protecting the second electrode from corrosion due to the presence of the first solvent in the second solvent are also described.

3 Claims, 1 Drawing Figure

ELECTROCHEMICAL CELL

This invention relates to electrochemical cells, and in particular to electrochemical cells where two electrodes must be operated in two different solvent containing one or more electrolytes.

In metal-air cells for example, one cannot successfully operate an oxygen cathode in aprotic organic solvent, and also one cannot operate an alkali metal anode in aqueous solution without rapid corrosion. Thus, a rechargeable oxygen-alkali metal system is difficult to operate.

According to the invention the cell comprises at least two compartments, first and second, separated by a semipermeable membrane, said compartments containing first and second solvent, electrolyte and electrode respectively. The first compartment is subdivided by a membrane which behaves as a bipolar electrode during the passage of electric current. The bipolar character of the membrane arises due to the evolution of certain atomic or molecular species on one side of the membrane and the ionization of said atomic or molecular species on the opposite side of the membrane.

The presence of a bipolar electrode in the cell prevents one of the two solvents present in the cell, for example an aprotic organic solvent, from interfering with the operation of one of the electrodes, such as an oxygen electrode, while the other membrane and the hydraulic flow of aprotic solution normal to, and away from the second electrode, protects said electrode from corrosion by a protogenous solvent such as water.

In certain cases the bipolar electrode can be utilized as a counter electrode to recharge the second electrode. For example, recharging of a discharged lithium electrode with an oxygen electrode as a counter electrode could damage the latter.

It is the objective of the present invention to provide an electrochemical cell of high utility in which an anode is operated in a different solvent than the cathode.

It is another objective of the invention to provide a process permitting for efficient electrochemical deposition or discharge of strongly electronegative metals in cells utilizing aqueous counter electrodes.

It is still another objective of the present invention to provide a half cell system capable of protecting the strongly electronegative electrodes in aprotic media in contact with protogenous media, and in particular with aqueous electrolytic solutions, from absorption of said protogenous solvents by the aprotic solvent containing the negative electrode.

The above objectives of the invention will become clear after considering the specific embodiment of the invention in detail.

Referring now to the drawing:

FIG. 1 is a diagrammatic sectional view of an electrochemical cell.

Electrochemical cell 1 comprises:
the housing 2, made of stainless steel
the positive electrode 3, such as an oxygen electrode (oxygen duct not shown), or a nickel oxide electrode
the lead of the positive electrode 4
the semi-dry conducting fibrous structure such as nickel felt or carbon cloth coated with hydrogen ionization catalyst, such as Pt 5, and bearing an aqueous electrolyte such as LiOH 5 is in contact with 6.
The bipolar hydrogen permeable membrane 6, made of Pd or of an alloy of the metals which form stable hydrides like metals in groups III, IV, V, and rare earth metals with transition metals of groups VI, VII, and VIII which form unstable hydrides, for example Ti-Fe or Ti-Ni alloys.
the lead to the bipolar membrane 7
the gas duct 8
the pump 9
the semi-dry matrix bearing some aqueous electrolyte such as Li-OH 10
the gas duct 11
the semi-permeable membrane such as cellophane, grafted polyethylene, etc. 12
space allowing for flow of the organic solvent toward the drying means 14, 13
organic solvent drying means 14
the porous partition 15, made of polypropylene or ceramic fibers
the negative electrode chamber filled with dry organic solvent such as propylene carbonate saturated with LiOH or any soluble Li salt of an anion not reducible by Li 16
the lithium or lithium/aluminum electrode on porous Ni matrix 17
the negative electrode lead 18.

When the above-described system represents battery cell operation, the discharge of the system involves the following processes.

The positive electrode 3, such as an oxygen electrode, produces OH⁻ as a result of the reduction of oxygen.

$$\tfrac{1}{2}O_2 + H_2O + 2e^- \rightarrow 2OH^- \qquad 1$$

At the same time, water is discharged on the cathodic side of the bipolar electrode, depositing adsorbed atomic hydrogen on the surface of the membrane 6. Part of the hydrogen diffuses to the anodic side and oxidizes there, and part recombines, giving H₂, which proceeds to the catalized matrix 5 along 11 and becomes oxidized there. The reactions are:

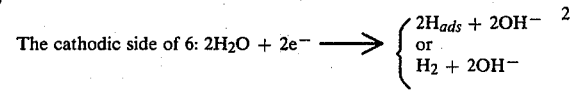

$$\text{The cathodic side of 6: } 2H_2O + 2e^- \longrightarrow \begin{cases} 2H_{ads} + 2OH^- \\ \text{or} \\ H_2 + 2OH^- \end{cases} \qquad 2$$

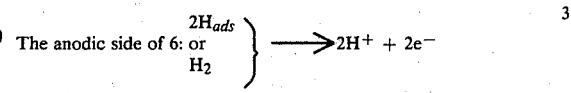

$$\text{The anodic side of 6: } \begin{rcases} 2H_{ads} \\ \text{or} \\ H_2 \end{rcases} \longrightarrow 2H^+ + 2e^- \qquad 3$$

The net result is that electric current is transmitted by membrane 6. Organic solvents cannot penetrate membrane 6.

The hydrogen ions produced by 5 and 6 are neutralized by OH⁻ produced by the oxygen electrode.

$$2H^{3O} + 2OH^- \rightarrow 2H_2O \qquad 4$$

Half of this water is consumed by the reaction (1). Therefore it is necessary to supplement the water vapor circulation, indicated by arrows, by adding water from the container 19.

During the same process of discharge of the cell, the lithium electrode gets oxidized to Li⁺, producing LiOH.

The back diffusion of the water from 10 and 12 is prevented by the flow of the organic electrolyte away from the negative electrode 17 across of porous partition 15 and to the drying means 14, where the water is removed and returned to 10 via the duct 20. Electric continuity thus exists between the oxygen and lithium electrodes.

During the charging of the cell, lithium is deposited on the Ni matrix from the dry electrolyte circulated through the drying means 14 in the same direction as during the charge. In case the anodic process is damaging to the oxygen cathode, the recharging can take place with the bipolar membrane as the counter electrode.

The above described process is an illustration of the invention which is applicable to a broad range of cathode and anode materials, and can be adapted to various useful applications by those skilled in art.

I claim:

1. A method of operating an electrochemical cell as a galvanic cell or as an electrolytic cell, said cell comprising
   a housing, a semipermeable membrane dividing the housing into two chambers, first and second, said first chamber containing protogenous ion-conducting liquid and a positive electrode, said second compartment containing an aprotic, ion-conducting liquid and also containing a negative electrode which corrodes when exposed to the protogenous liquid, said protogenous liquid being partly soluble in the aprotic liquid;
   said method preventing the corrosive protogenous liquid from reaching said negative electrode, comprising the steps of
   subdividing the second chamber by means of a porous partition into two compartments, one adjacent to said membrane, and the other containing the negative electrode;
   flowing the aprotic liquid, free of the protogenous liquid, into the compartment containing the negative electrode;
   flowing the aprotic liquid across the porous partition away from the negative electrode to prevent the protogenous liquid present in the aprotic liquid from reaching the negative electrode;
   flowing said aprotic liquid from the porous partition and between it and the semipermeable membrane and into the drying means, in order to remove the protogenous substance which gets into the aprotic liquid while it is in contact with the semipermeable membrane,
   flowing aprotic liquid back to the negative electrode compartment.

2. An electrochemical cell comprising a housing,
   a metallic bipolar membrane permeable to hydrogen and subdividing said housing into positive and negative electrode chambers, each chamber containing protogenous, ionconducting liquid;
   a system, capable of transferring atomic and molecular hydrogen simultaneously across said membrane, said electrode system comprising
   a metallic bipolar membrane permeable to diffusing atomic hydrogen and impervious to liquids;
   a fibrous or porous layer of a catalyst of hydrogen oxidation and evolution reactions, adjacent to and in electronic contact with said metallic membrane;
   duct means capable of collecting the hydrogen evolved on the negative side of said bipolar membrane during operation of the system as a galvanic cell, delivering it to the fibrous or porous hydrogen reaction catalyst adjacent to the opposite side of the membrane, so that two ways of transfer of hydrogen from one side of the bipolar electrode to the other are available, thus improving the efficiency of the process, said process being reversed during the operation of the cell as an electrolytic cell.

3. An electrochemical cell, capable of being operated as a galvanic cell or as an electrolytic cell comprising
   a housing, said housing being divided into four compartments by a metallic membrane, semipermeable membrane and a porous partition, whereby the first compartment contains an aqueous solution of an electrolyte and the positive electrode in contact with said solution, said first compartment being separated from the second compartment by a solid bipolar membrane electrode permeable to atomic hydrogen when it is created electrolytically on one of its surfaces, said membrane being covered on the side of the first compartment by a fibrous or porous catalyst of hydrogen oxidation and evolution reactions, the second compartment being located between said metallic membrane and the semipermeable membrane, and at least partially filled with an aqueous solution of electrolyte, a means of circulating gaseous hydrogen and water between the second compartment and the first compartment and a means of circulating hydrogen between the second compartment and the fibrous hydrogen catalyst in the first compartment being provided, said semipermeable membrane inadvertantly allowing permeation of water from the second compartment to the third compartment by diffusion, said third compartment being filled by an aprotic solution of an electrolyte and being in communication with the drying means, said third compartment being separated from the fourth compartment by a porous partition through which dry aprotic solution flows fast enough to prevent the diffusion of moisture across the partition into the fourth compartment containing an alkali metal negative electrode, said negative electrode being electrically connected across said four compartments with the positive electrode, means for flowing said aprotic solvent from the fourth compartment across the porous partition to the third compartment, then to the conventional drying means and back to the fourth compartment, thus closing the drying operation loop.

* * * * *